(12) United States Patent
Wu et al.

(10) Patent No.: US 10,710,878 B2
(45) Date of Patent: Jul. 14, 2020

(54) HYDROGEN GENERATION METHOD, SYSTEM, AND SOLUTION USED THEREIN

(71) Applicant: National Chiao Tung University, Hsinchu (TW)

(72) Inventors: Tung-Kung Wu, Hsinchu (TW); Jia-Hao Lin, Tainan (TW); Chun-Sheng Peng, Hsinchu (TW); Yi-Ting Chen, Taipei (TW)

(73) Assignee: National Chiao Tung University, Hsinchu (TW)

(*) Notice: Subject to any disclaimer, the term of this patent is extended or adjusted under 35 U.S.C. 154(b) by 24 days.

(21) Appl. No.: 15/660,581

(22) Filed: Jul. 26, 2017

(65) Prior Publication Data

US 2018/0201505 A1   Jul. 19, 2018

(30) Foreign Application Priority Data

Jan. 19, 2017 (TW) .............................. 106101975 A

(51) Int. Cl.
| | |
|---|---|
| *C01B 3/22* | (2006.01) |
| *B01J 31/22* | (2006.01) |
| *B01J 35/00* | (2006.01) |
| *B01J 19/12* | (2006.01) |
| *B01J 31/00* | (2006.01) |

(52) U.S. Cl.
CPC .............. *C01B 3/22* (2013.01); *B01J 19/127* (2013.01); *B01J 31/00* (2013.01); *B01J 31/226* (2013.01); *B01J 35/004* (2013.01); *B01J 2219/0877* (2013.01); *B01J 2219/0892* (2013.01); *B01J 2219/1203* (2013.01); *B01J 2231/763* (2013.01); *B01J 2531/821* (2013.01); *C01B 2203/0277* (2013.01); *C01B 2203/1064* (2013.01); *C01B 2203/1211* (2013.01); *C01B 2203/84* (2013.01); *Y02P 30/30* (2015.11)

(58) Field of Classification Search
CPC ................ B01J 31/226; B01J 2531/821; B01J 2219/0892; B01J 2219/0877; B01J 2231/763; C01B 2203/1064; C01B 2203/1211; C01B 19/127
USPC ...................................... 204/157.52; 422/186
See application file for complete search history.

(56) References Cited

U.S. PATENT DOCUMENTS

| | | | | |
|---|---|---|---|---|
| 4,367,131 | A * | 1/1983 | Gratzel | ................... C01B 3/042 204/157.52 |
| 2003/0201161 | A1* | 10/2003 | Nocera | ..................... C01B 3/04 204/157.52 |

(Continued)

OTHER PUBLICATIONS

Summers et al, "Photochemical Dihydrogen Production Using an Analogue of the Active Site of [NiFe] Hydrogenase," Inorg. Chem. 2014, vol. 53, pp. 4430-4439 (Year: 2014).*

(Continued)

*Primary Examiner* — Nicholas A Smith
*Assistant Examiner* — Colleen M Raphael
(74) *Attorney, Agent, or Firm* — Wang Law Firm, Inc.

(57) ABSTRACT

A hydrogen generation method including steps as follows: adding a nitrogen-substituted derivative of an alkyldithiolate ruthenium complex as a biomimetic hydrogenase photocatalyst into a solution, adding an organic acid into the solution, adding a P-ligand into the solution, adding an electron donor into the solution, and irradiating the solution with light in order to generate hydrogen.

10 Claims, 4 Drawing Sheets

(56) References Cited

U.S. PATENT DOCUMENTS

| | | | |
|---|---|---|---|
| 2010/0113719 A1* | 5/2010 | Patton | B01J 31/1845 |
| | | | 502/155 |
| 2010/0258429 A1* | 10/2010 | Ugolin | B01J 19/126 |
| | | | 204/157.43 |
| 2012/0267234 A1* | 10/2012 | Reece | B01J 19/127 |
| | | | 204/157.5 |
| 2013/0244865 A1* | 9/2013 | Muranaka | C07C 5/03 |
| | | | 423/648.1 |
| 2014/0255296 A1* | 9/2014 | Beller | C01B 3/22 |
| | | | 423/648.1 |

OTHER PUBLICATIONS

Justice et al, "Dirutheniunn Dithiolato Cyanides: Basic Reactivity Studies and a Post Hoc Examination of Nature's Choice of Fe versus Ru for Hydrogenogenesis," Inorg. Chem. 2006, vol. 45, pp. 2406-2412 (Year: 2006).*

Deeming et al, "Reactions of trans-[RuCl2(CO)2(PEt3)2] with 1,1-dithiolates: Stepwise formation of cis-[Ru(CO)(PEt3)(S2X)] (X=CNMe2, CNEt2, COEt, P(OEt)2, PPh2)," J. of Organometallic Chemistry, vol. 691, (2006) pp. 79-85 (Year: 2006).*

\* cited by examiner

HYDROGEN GENERATION METHOD, SYSTEM, AND SOLUTION USED THEREIN

CROSS-REFERENCE TO RELATED APPLICATION

This application claims priority from Taiwan Patent Application No. 106101975, filed on Jan. 19, 2017, at the Taiwan Intellectual Property Office, the contents of which are hereby incorporated by reference in their entirety for all purposes.

BACKGROUND OF THE INVENTION

1. Field of the Invention

The present invention relates to a hydrogen generation method, system and solution used therein. In particular, it relates to a hydrogen generation method, system and solution used therein using a nitrogen-substituted derivative of an alkyldithiolate ruthenium complex as a biomimetic hydrogenase photocatalyst.

2. Description of the Related Art

Except for nuclear fuel, hydrogen has the highest combustion heat in comparison with all of fossil fuels, chemical fuels and biofuels, and is 142,351 kJ/kg, three times of that of gasoline. Hydrogen has a low ignition point and a high burning velocity, and further the sole product of burning hydrogen is water. Hence, it does not pollute the atmosphere. The energy produced by burning hydrogen may further generate mechanical work in a thermodynamic engine. Additionally, hydrogen is able to generate electrical energy by an electrochemical reaction with oxygen. Thus, hydrogen is a clean and environmentally friendly fuel. Furthermore, when compared with coal or oil, there is no need for significant retrofitting of prior art apparatus to adapt for hydrogen use. For example, a car's internal combustion engine need only have minor modifications for hydrogen use.

A number of methods have been developed for hydrogen generation in prior art, and these are briefly described hereinafter. Most of the hydrogen generation methods relate to a reforming process of natural gas, for example, obtaining hydrogen by a reforming process of gaseous methane or partial oxidation of methane by burning in air. However, the hydrogen generation methods of the reforming process of a gaseous raw material require input of energy in the form of reaction conditions of high pressure and high temperature. Additionally, although electrolysis of water also generates hydrogen, external electric power is still needed to perform an electrolysis reaction.

Another method to generate hydrogen is the gasification of fossil or organic fuels such as coal or biomass to produce synthesis gas (syngas), which contains hydrogen. The hydrogen-generating method consists of a recombination process of regenerate liquid transforming biomass into ethanol or bio-oil, to produce syngas, and then separating the hydrogen from the gas mixture. However, the method generating hydrogen by gasification and a recombination process of regeneration liquid need external energy and reaction conditions of high pressure or high temperature.

In addition, there is also a hydrogen generation method that electrolyzes water using thermal energy produced by nuclear energy. However, it is difficult to remove the nuclear waste and related pollution produced by this method.

Besides, there is still a hydrogen generation method that splits water by breeding chlorella and the microorganism extracts hydrogen from the biomass contained therein. Nevertheless, the method needs a considerably large area to breed chlorella, cyanobacteria and other microorganisms, and the yield is still low. Moreover, another hydrogen generation method that splits water by a specific semiconductor material under solar light is used. However, the manufacturing process of the semiconductor material still contaminates the environment.

SUMMARY OF THE INVENTION

To solve the disadvantages of the prior art mentioned above, the purpose of the present invention is to provide a hydrogen generation method, system and solution used therein.

According to at least a purpose of the present invention, a hydrogen generation method is provided, comprising: adding a nitrogen-substituted derivative of an alkyldithiolate ruthenium complex as a biomimetic hydrogenase photocatalyst into a solution, adding an organic acid reactant into the solution, adding a P-ligand into the solution, adding an electron donor into the solution, and irradiating light into the solution in order to produce hydrogen.

According to at least a purpose of the present invention, a hydrogen generation system including a reaction chamber is provided, wherein the reaction chamber comprises a container containing a solution, and a lens converging solar light thereby irradiating the solution in order to generate hydrogen. A plurality of solutes of the solution comprises: a nitrogen-substituted derivative of an alkyldithiolate ruthenium complex as a biomimetic hydrogenase photocatalyst, an organic acid reactant, a P-ligand and an electron donor.

According to at least a purpose of the present invention, a hydrogen generation method or a solution in a system is provided, comprising: a plurality of solutes and a solvent, wherein the plurality of solutes comprises a nitrogen-substituted derivative of an alkyldithiolate ruthenium complex as a biomimetic enzyme as a photocatalyst for hydrogen generation, formic acid as a reactant, tri(o-tolyl)phosphine as a P-ligand and triethylamine as an electron donor. In addition, the solvent is dimethylformamide (DMF).

Accordingly, the hydrogen generation method, system and solution used herein provided by the present application may comprise one or more advantages as follows:

(1) Enhance the yield of hydrogen generation;

(2) Converge solar light by a Fresnel lens to enhance the utilization efficiency so as to reduce excess cost produced by providing external artificial electric energy or thermal energy to the reaction;

(3) Improve the economic cycle of hydrogen, wherein the generated carbon dioxide may be recycled by a carbon capture technique in order to achieve a purpose of Energy Saving and Carbon Reduction (ESCR).

DESCRIPTION OF THE PREFERRED EMBODIMENTS

Figure 1:
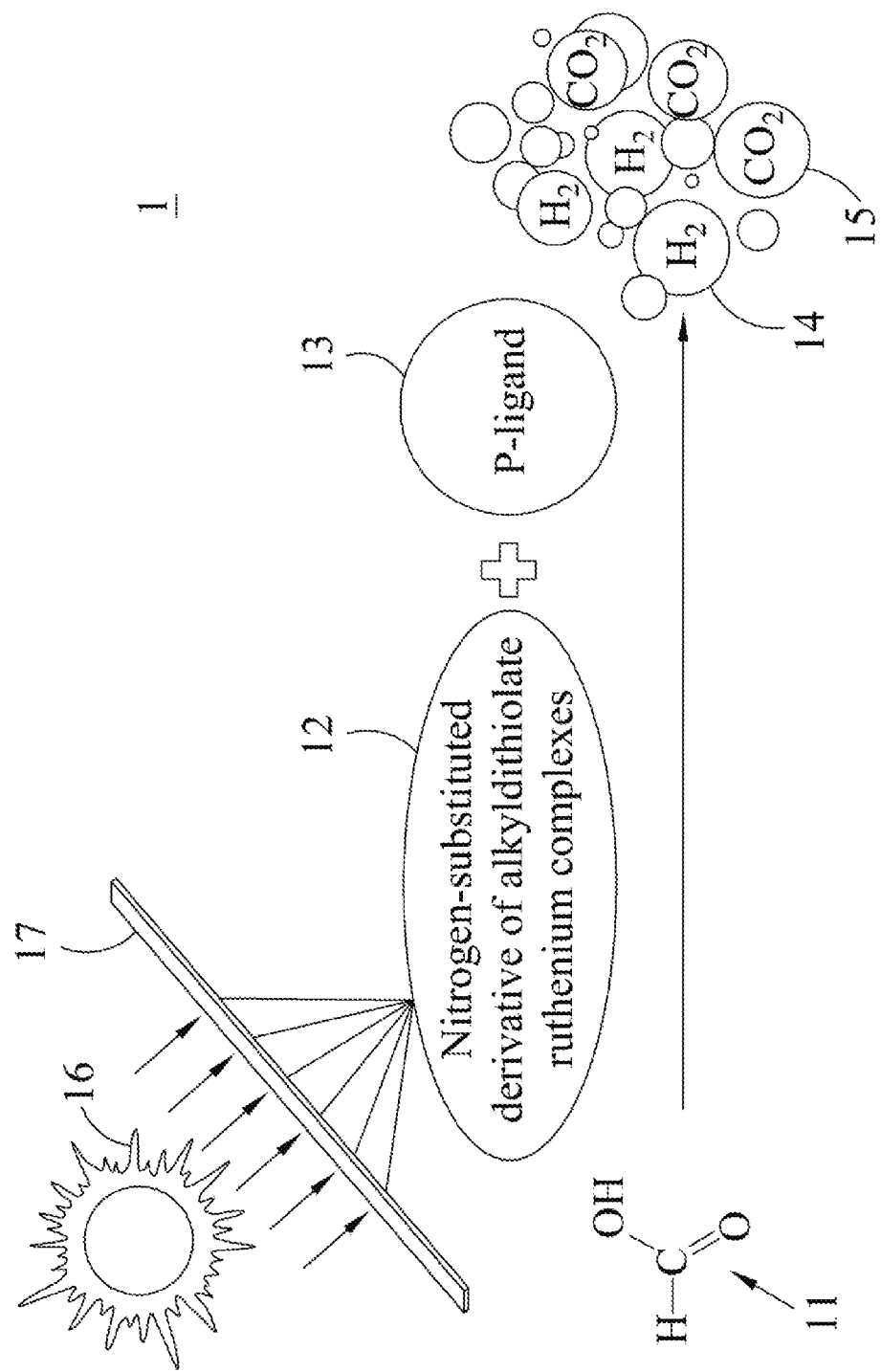
FIG. 1 is a schematic diagram illustrating the hydrogen generation reaction of an embodiment of the present invention.

For the ease of realizing the technical features, contents, advantages and effects of the present invention by examiners, a detailed description of the embodiments and the appending drawings of the present invention will be stated hereinafter. The drawings are merely used to illustrate and support the content of the specification and their reality ratios and configurations are not intended to be limiting in any way regarding the implementation of the present invention that must be explained first.

It should be noted that, although terms such as "the first", "the second" and "the third" are used to describe a variety of elements, these elements are not intended to be limiting. The terms are only used to distinguish one element from another. Therefore, "the first" element discussed below may be written as "the second" element without departing from the teachings of the present invention.

In the embodiments of the present invention, a hydrogen generation method, system and solution used therein, wherein the solution is irradiated by solar light under normal temperature and pressure (NTP) conditions. In the embodiments of the present invention, an organic acid reactant, a nitrogen-substituted derivative of an alkyldithiolate ruthenium complex as a biomimetic hydrogenase photocatalyst, a P-ligand and an electron donor are added as solutes into a solution, and then the solution is irradiated with sunlight so as to decompose the organic acid reactant into hydrogen and other gases except for carbon monoxide. Then, they further obtain hydrogen by gas separation apparatuses or methods in order to achieve the generation of hydrogen. Besides, since the generated gas does not comprise carbon monoxide (CO), the gas generated by the hydrogen generation method and system of the embodiments of the present invention may be directly used as an energy source in a hydrogen fuel engine.

In the embodiments of the present invention, the biomimetic hydrogenase photocatalyst is a nitrogen-substituted derivative of an alkyldithiolate ruthenium complex. Further, the organic acid reactant may be formic acid; the P-ligand may be tri(o-tolyl)phosphine; the electron donor may be triethylamine; the solvent of the solution may be dimethylformamide; and other gases may be carbon dioxide ($CO_2$). Additionally, the embodiments of the present invention do not limit the type of the organic acid reactant, the P-ligand, the electron donor and the solutes of the solution.

In other words, a person skilled in the art is able to select an organic acid reactant having chemical characteristics similar to formic acid, a P-ligand having chemical characteristics similar to tri(o-tolyl)phosphine, an electron donor having chemical characteristics similar to triethylamine, and a solute having chemical characteristics similar to dimethylformamide so that the nitrogen-substituted derivative of the alkyldithiolate ruthenium complex may play a role as the biomimetic enzyme photocatalyst for hydrogen generation so as to decompose the organic reactant as well as to generate hydrogen.

Furthermore, in the embodiments of the present invention, a Fresnel lens may be used to converge the solar light so as to concentrate the irradiation to the said solution in order to enhance the generation rate of hydrogen. Without doubt, the lens used in the embodiments of the present invention is not limited to the Fresnel lens, that is, a person skilled in the art is able to select another type of condensing lens for a same purpose. In the embodiments of the present invention, the solar light is an energy source for enhancing the generation rate of hydrogen. Since the solar light is used as an energy source, other external energy sources for catalyzing the reaction are unnecessary. Additionally, the light for irradiation is not limited to the solar light, that is, other types of light may also be used. However, it is preferably to select a light having a wavelength close to that of ultraviolet.

First, please refer to FIG. 1, which illustrates a schematic diagram of the hydrogen generation reaction of an embodiment of the present invention. In FIG. 1, the hydrogen generation reaction occurs in NTP condition 1, wherein said NTP condition 1 is a condition under 27° C. and 1 atm. However, the present invention does not limit that the hydrogen generation reaction can only occur in NTP condition 1. The hydrogen generation reaction may occur in other conditions such as high temperature/high pressure. In this embodiment, the generation rate of the hydrogen by the hydrogen generation reaction is close to that by a natural hydrogenase. Specifically, the generated gas does not include carbon monoxide so that it can directly be used as an energy source in a hydrogen fuel engine.

In FIG. 1, the solar light of the sun 16 is converged to irradiate using a Fresnel lens 17 a solution including formic acid 11, nitrogen-substituted derivative of alkyldithiolate ruthenium complex 12 and P-ligand 13. In this embodiment, formic acid 11 may be a reactant, nitrogen-substituted derivative of alkyldithiolate ruthenium complex 12 may be a biomimetic hydrogenase photocatalyst, and P-ligand 13 may be tri(o-tolyl)phosphine. Further, in this embodiment, the solution has an electron donor such as triethylamine. Besides, solvent of the solution may be dimethylformamide, and it is not limited thereto.

Nitrogen-substituted derivative of alkyldithiolate ruthenium complex 12 may include a complex selected from at least a group as follows, for example, nitrogen-substituted derivative of alkyldithiolate ruthenium complex 12 may include a complex having a structure of Formulas (1) to (3) except for Formula (2), or a complex merely having a structure of Formula (1).

In summary, the present invention is not limited by the types and combinations of nitrogen-substituted derivative of alkyldithiolate ruthenium complex 12.

[Ru$_3$(CO)$_9$(μ-SCH$_2$CH(NCO$_2$(C(CH$_3$)$_3$))CH$_2$S)]   Formula (1)

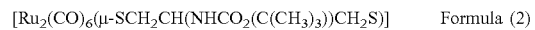
[Ru$_2$(CO)$_6$(μ-SCH$_2$CH(NHCO$_2$(C(CH$_3$)$_3$))CH$_2$S)]   Formula (2)

[Ru$_2$(CO)$_5$(μ-SCH$_2$CH(NHCO$_2$(C(CH$_3$)$_3$))CH$_2$S)]   Formula (3)

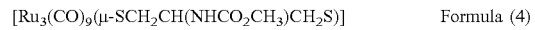
[Ru$_3$(CO)$_9$(μ-SCH$_2$CH(NHCO$_2$CH$_3$)CH$_2$S)]   Formula (4)

On the other hand, the aforementioned Formulas (1) to (4) may be indicated by a general formula [(Ru)$_X$(CO)$_Y$(μ-SCH$_2$CH(NHZ)CH$_2$S], wherein X is an integer selected from 1 to 6, Y is an integer selected from 1 to 9, and Z is a substituted functional group such as $CO_2(C(CH_3)_3)$ or $CO_2CH_3$. That is, the nitrogen-substituted derivative of alkyldithiolate ruthenium complex 12 may be a complex having a structure of the general formula [(Ru)$_X$(CO)$_Y$(μ-SCH$_2$CH(NHZ)CH$_2$S].

Figure 2:
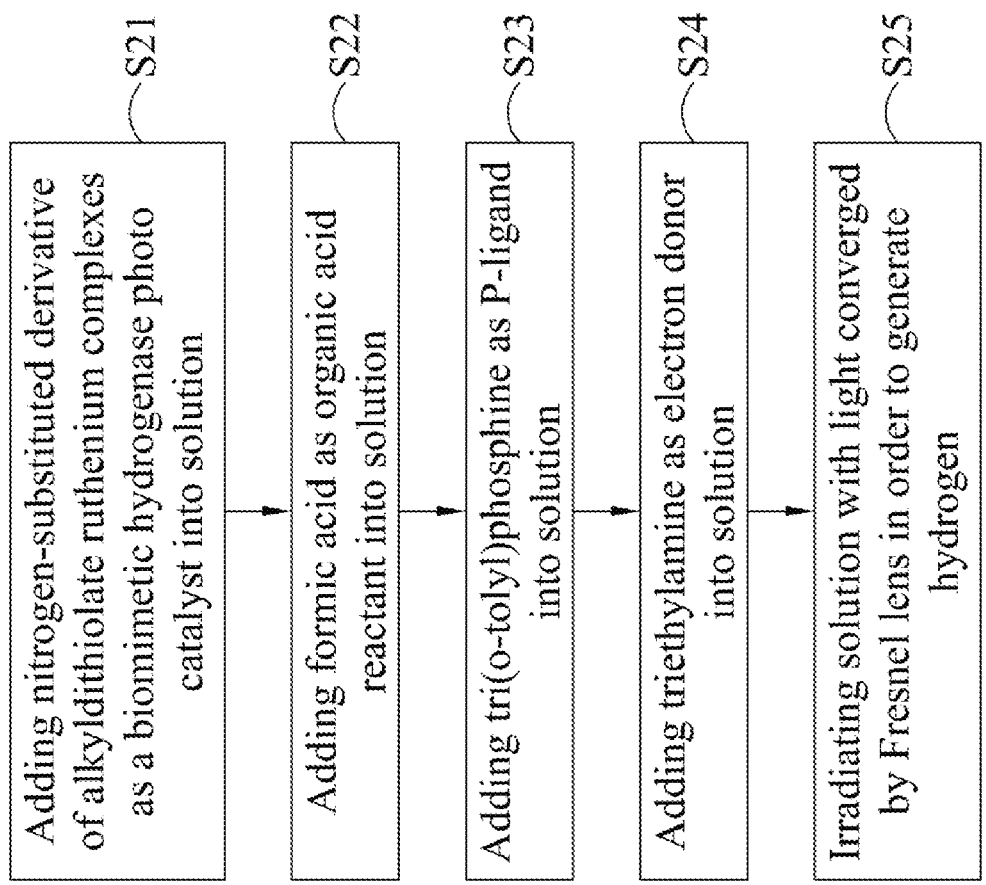
FIG. 2 is a flow chart illustrating the hydrogen generation method of an embodiment of the present invention.

Next, please refer to FIG. 2, which illustrates a flow chart of the hydrogen generation method of an embodiment of the present invention. First, according to step S21, add a nitrogen-substituted derivative of an alkyldithiolate ruthenium complex as a biomimetic hydrogenase photocatalyst into a solution, wherein the amount of solvent is about 1 ml of dimethylformamide, and the amount of the nitrogen-substituted derivative of the alkyldithiolate ruthenium complex is about 1 µmol.

Then, according to step S22, add formic acid as a reactant into the solution. Next, according to step S23, add tri(o-tolyl)phosphine as a P-ligand into the solution, wherein the amount of tri(o-tolyl)phosphine is about 3 µmol. According to step S24, add triethylamine as an electron donor into the solution, wherein the reaction volume is 5 ml which contains a 4 ml mixture of formic acid and triethylamine at a molar ratio of 5:2. It should be noted that, although the aforementioned content discloses that the steps S22 and S24 may be performed simultaneously, the present invention does not limit the order of performing the steps S21 to S24. In addition, said molar ratio of formic acid and triethylamine, and said amounts of tri(o-tolyl)phosphine and the nitrogen-substituted derivative of the alkyldithiolate ruthenium complex are not intended to limit the present invention. Finally, according to step S25, the solution is irradiated with the light converged by the Fresnel lens to generate hydrogen, wherein the light may be solar, and the light used to irradiate the solution may substantially be an energy source used to catalyze the reaction so as to enhance the generation rate.

Figure 3:
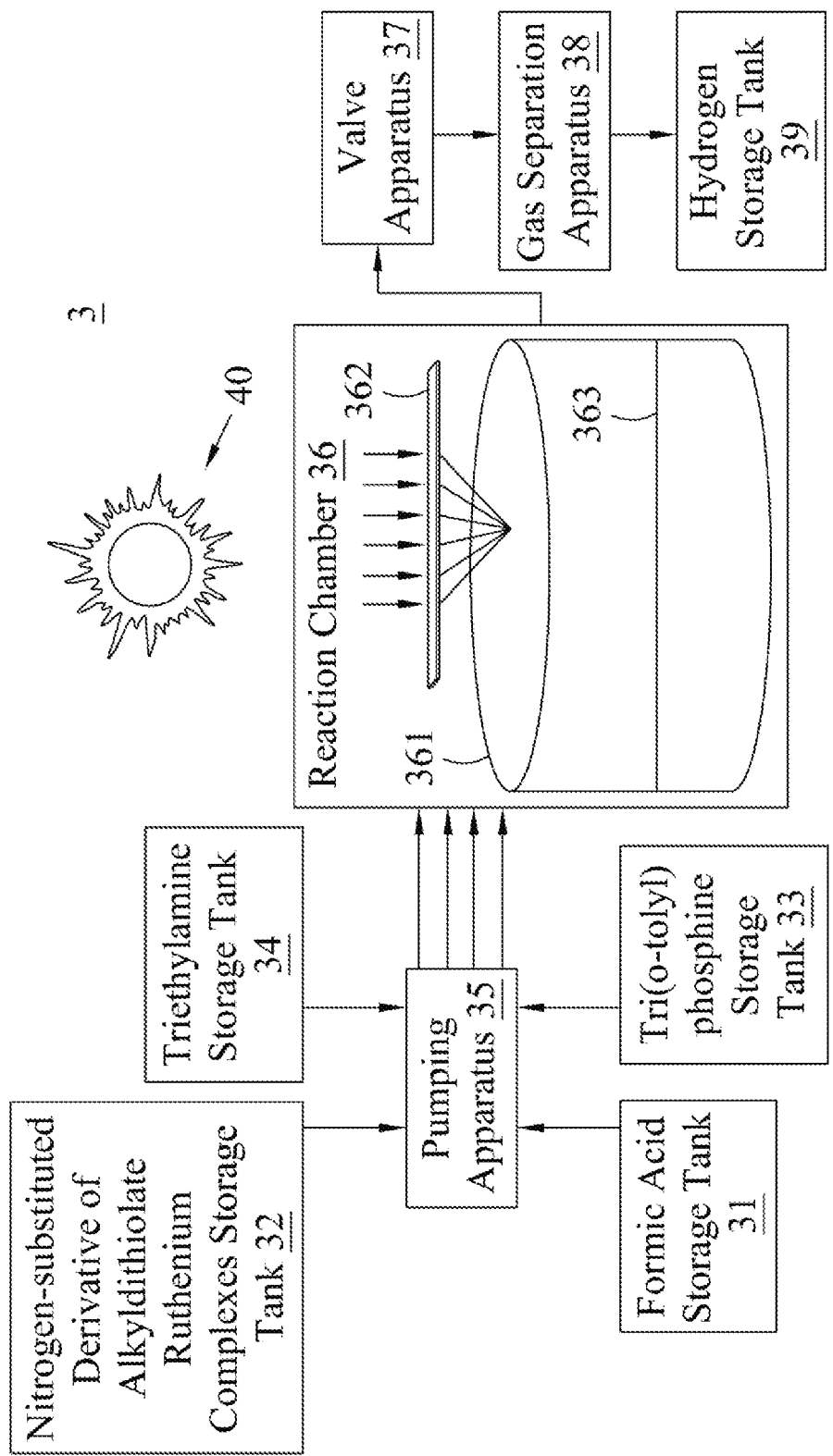
FIG. 3 is a schematic diagram illustrating the hydrogen generation system of an embodiment of the present invention.

Next, please refer to FIG. 3, which illustrates a schematic diagram of the hydrogen generation system of an embodiment of the present invention. A hydrogen generation system 3 comprises a formic acid storage tank 31, nitrogen-substituted derivative of alkyldithiolate ruthenium complex storage tank 32, tri(o-tolyl)phosphine storage tank 33, triethylamine storage tank 34, pumping apparatus 35, reaction chamber 36, valve apparatus 37, gas separation apparatus 38 and hydrogen storage tank 39. The formic storage tank 31, the nitrogen-substituted derivative of alkyldithiolate ruthenium complex storage tank 32, the tri(o-tolyl)phosphine storage tank 33, and the triethylamine storage tank 34 are used to store formic acid, the nitrogen-substituted derivative of the alkyldithiolate ruthenium complex, tri(o-tolyl)phosphine and triethylamine, respectively.

The pumping apparatus 35 has a plurality of pumping units, which transfer formic acid, the nitrogen-substituted derivative of alkyldithiolate ruthenium complex, tri(o-tolyl)phosphine and triethylamine stored in the formic acid storage tank 31, the nitrogen-substituted derivative of alkyldithiolate ruthenium complex storage tank 32, the tri(o-tolyl)phosphine storage tank 33, and the triethylamine storage tank 34 respectively to a container 361 in the reaction chamber 36. The reaction chamber 36 further includes a Fresnel lens 362 which converges the light from a sun 40 to irradiate the solution 363 contained in a container 361, wherein the solutes contained in a solution 363 comprises formic acid, the nitrogen-substituted derivative of alkyldithiolate ruthenium complex, tri(o-tolyl)phosphine and triethylamine. Further, the solvent of the solution 363 is dimethylformamide. Preferably, the hydrogen generation system 3 may further include a dimethylformamide storage tank (not illustrated in the drawings), and the pumping apparatus 35 may further transfer the dimethylformamide stored therein to the container 361 of reaction chamber 36.

The conditions in the reaction chamber 36 may be NTP conditions, and it is not necessary to dispose a pressure control apparatus and heating apparatus to gain pressure and temperature. The formic acid in the solution 363 within the reaction chamber 36 may be decomposed into hydrogen and carbon dioxide when the nitrogen-substituted derivative of the alkyldithiolate ruthenium complex is irradiated by the solar light. The valve apparatus 37 discharges the generated hydrogen and carbon dioxide from the reaction chamber 36 to the gas separation apparatus 38 by controlling a valve therein. The gas separation apparatus 38 may separate hydrogen from carbon dioxide by a physical or chemical means, and the separated hydrogen may be transferred to the hydrogen storage tank 39 for storage. The hydrogen stored in the hydrogen storage tank 39 may be taken out by various apparatus (not illustrated in the drawings) to use as an energy fuel.

Figure 4:
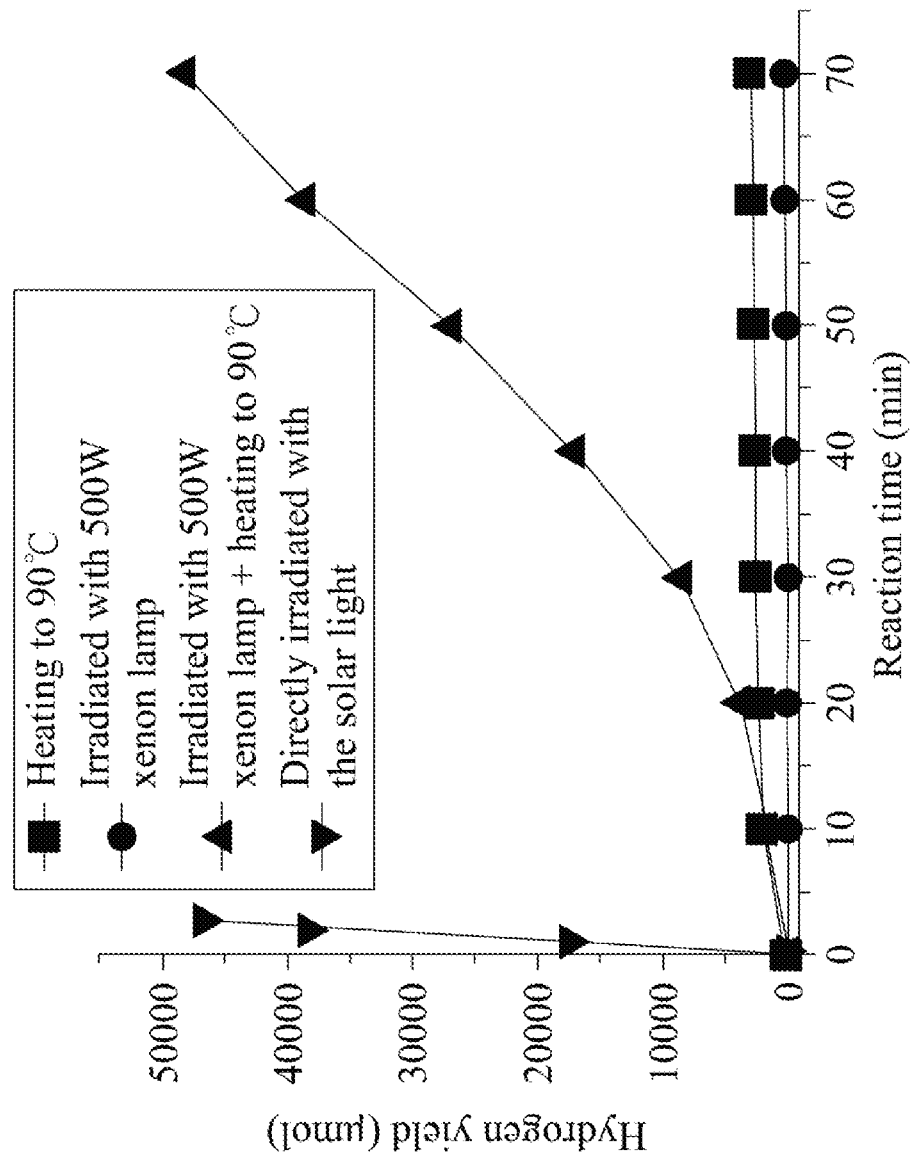
FIG. 4 is a graph showing a relationship between hydrogen generation yield and the reaction time of the hydrogen generation method of an embodiment of the present invention.

Next, please refer to FIG. 4, which illustrates a graph showing a relationship between hydrogen generation yield and the reaction time of the hydrogen generation method of an embodiment of the present invention. Four curves illustrated in FIG. 4 show the relationship between the hydrogen yield obtained by the solution prepared by steps S21 to S24 of the embodiment shown by FIG. 2 of the present invention and the reaction time under four different conditions. In FIG. 4, heating the solution to 90° C. by a simple heating process or simply irradiating the solution with a 500W xenon lamp does not produce any significant hydrogen yield in 70 min. (as the curves with squares and circles indicate). Although heating the solution to 90° C. and irradiating the solution with the 500W xenon lamp may enhance the hydrogen yield and the generation rate (as the curve with triangles indicates), the generation rate is still low in comparison with irradiating the solution with the solar light converged by a Fresnel lens (as the curve with inverted triangles indicates). FIG. 4 shows that the means of generating hydrogen by irradiating the solution with the solar light converged by a Fresnel lens is better than the other means mentioned above. Further, the conversion efficiency is about 4 times that of the prior art in a preferable case.

Next, please refer to Table 1, which lists the conversion efficiency of hydrogen obtained by the hydrogen generation methods of other embodiments of the present invention, wherein the nitrogen-substituted derivative of the alkyldithiolate ruthenium complex is a complex having a structure of said Formula (1).

TABLE 1

| Embodiment No. | Nitrogen-substituted derivative of alkyldithiolate ruthenium complex (µmol) | P-ligand (µmol) | Temperature (Celsius) | Irradiation by 500 W xenon lamp/light filter | Conversion Number (TON)/ reaction time (min) | Conversion frequency (TOF, h$^{-1}$) | Hydrogen conversion efficiency |
|---|---|---|---|---|---|---|---|
| 1 | 2 | 6 | 90 | None/None | 2912 (70) | 2496 | 6 |
| 2 | 2 | 6 | room temperature, without heating | Yes/None | 191 (70) | 164 | 0.4 |

TABLE 1-continued

| Embodiment No. | Nitrogen-substituted derivative of alkyldithiolate ruthenium complex (μmol) | P-ligand (μmol) | Temperature (Celsius) | Irradiation by 500 W xenon lamp/light filter | Conversion Number (TON)/ reaction time (min) | Conversion frequency (TOF, $h^{-1}$) | Hydrogen conversion efficiency |
|---|---|---|---|---|---|---|---|
| 3 | 2 | 6 | 90 | Yes/None | 24789 (40) | 37183 | 99 |
| 4 | 1 | 3 | 90 | Yes/None | 48147 (70) | 41269 | 96 |
| 5 | 2 | 2 | 90 | Yes/None | 14001 (60) | 14001 | 56 |
| 6 | 2 | 4 | 90 | Yes/None | 22122 (60) | 22122 | 89 |
| 7 | 2 | 8 | 90 | Yes/None | 16789 (60) | 16789 | 67 |
| 8 | 2 | 6 | 60 | Yes/None | 267 (60) | 267 | 1.1 |
| 9 | 2 | 6 | 70 | Yes/None | 868 (60) | 868 | 3.5 |
| 10 | 2 | 6 | 80 | Yes/None | 3105 (60) | 3105 | 12.4 |
| 11 | 2 | 6 | 85 | Yes/None | 11189 (60) | 11189 | 45 |
| 12 | 2 | 6 | 90 | Yes/280 nm wavelength high-pass filter (light having wavelength higher than 280 nm is able to pass) | 24655 (60) | 24655 | 99 |
| 13 | 2 | 6 | 90 | Yes/280~390 nm wavelength band-pass filter | 2725 (60) | 2725 | 37 |
| 14 | 2 | 6 | 90 | Yes/301~384 nm wavelength band-pass filter | 9288 (60) | 9288 | 24 |
| 15 | 2 | 6 | 90 | Yes/355~469 nm wavelength band-pass filter | 6070 (60) | 6070 | 9 |
| 16 | 2 | 6 | 90 | Yes/334~480 nm wavelength band-pass filter | 2275 (60) | 2275 | 12 |
| 17 | 2 | 6 | 90 | Yes/345~542 nm wavelength band-pass filter | 3028 (60) | 3028 | 12 |
| 18 | 2 | 6 | 90 | Yes/280 nm wavelength high-pass filter | 3008 (60) | 3008 | 11 |

In summary, the embodiments of the present invention provide a hydrogen generation method, system and solution used therein by irradiating with solar light in NTP conditions without any external heating or pressure apparatus, which may reduce the cost of hydrogen generation. Additionally, the generated gas does not comprise carbon monoxide so that it can be directly used as an energy source in a hydrogen fuel engine.

It is to be understood that the present invention is not limited to the contents described above. Any equivalent modifications, variations and enhancements can be made thereto by those skilled in the art without changing the essential characteristics or technical spirit of the present invention, the technical and protective scope of which is defined by the following claims.

What is claimed is:

1. A hydrogen generation method, comprising:
   adding a nitrogen-substituted derivative of an alkyldithiolate ruthenium complex, having a chemical formula of $[(Ru)_X(CO)_Y(\mu\text{-}SCH_2CH(NHZ)CH_2S)]$, as a biomimetic hydrogenase photocatalyst into a solution, wherein X is 1-6, Y is 1-9 and Z is $CO_2(C(CH_3)_3)$ or $CO_2CH_3$;
   adding an organic acid reactant into the solution;
   adding a P-ligand into the solution;
   adding an electron donor into the solution; and
   irradiating the solution with light in order to produce hydrogen.

2. The method of claim 1, wherein the organic acid reactant is formic acid, the P-ligand is tri(o-tolyl)phosphine, the electron donor is triethylamine, and a solvent of the solution is dimethylformamide (DMF).

3. The method of claim 2, wherein the solution comprises 1 μmol of the nitrogen-substituted derivative of the alkyldithiolate ruthenium complex, 3 μmol of tri(o-tolyl)phosphine, 1 ml of dimethylformamide, and 4 ml of a mixture of formic acid and triethylamine in which the molar ratio of formic acid to triethylamine is 5:2.

4. The method of any one of claims 1 to 3, wherein the light is converged by a Fresnel lens to irradiate the solution, wherein the light is solar light.

5. A hydrogen generation system, comprising:
   a reaction chamber including a container containing a solution; and
   a lens converging solar light to irradiate the solution in order to generate hydrogen;
   wherein a plurality of solutes comprises a nitrogen-substituted derivative of an alkyldithiolate ruthenium complex as a biomimetic hydrogenase photocatalyst, an organic acid reactant, a P-ligand, and an electron donor.

6. The system of claim 5, wherein the organic acid reactant is formic acid, the P-ligand is tri(o-tolyl)phosphine, the electron donor is triethylamine, and a solvent of the solution is dimethylformamide.

7. The system of claim 6, further comprising:
- a plurality of storage tanks storing the formic acid, the tri(o-tolyl)phosphine, the triethylamine, and the dimethylformamide; and
- a pumping apparatus having a plurality of pumping units which transfer the formic acid, the tri(o-tolyl)phosphine, the triethylamine, and the dimethylformamide from each of the corresponded storage tanks to the reaction chamber.

8. The system of claim 5, further comprising:
- a valve apparatus discharging the hydrogen and the carbon dioxide from the reaction chamber to a gas separation apparatus by controlling a valve; the gas separation apparatus separating the hydrogen and the carbon dioxide; and
- a hydrogen storage tank storing the separated hydrogen.

9. The system of any one of claims 5 to 8, wherein the lens is a Fresnel lens.

10. A solution used in a hydrogen generation method, comprising:
- a plurality of solutes, comprising a nitrogen-substituted derivative of an alkyldithiolate ruthenium complex as a biomimetic hydrogenase photocatalyst, formic acid as an organic acid reactant, tri(o-tolyl)phosphine as a P-ligand, and triethylamine as an electron donor; and
- a solvent, which is dimethylformamide.

* * * * *